May 1, 1928.

G. E. EDMUNDS 1,667,844

CONVEYER CHAIN

Filed April 5, 1926

2 Sheets-Sheet 1

Inventor
Glenn E. Edmunds
By W. A. McDowell.
Attorney

May 1, 1928.
G. E. EDMUNDS
CONVEYER CHAIN
Filed April 5, 1926
1,667,844
2 Sheets-Sheet 2
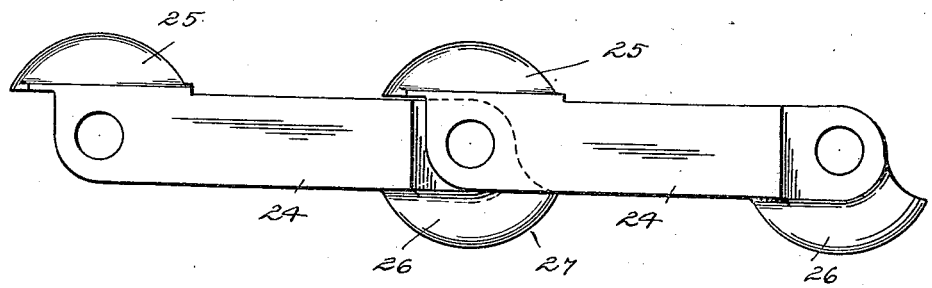
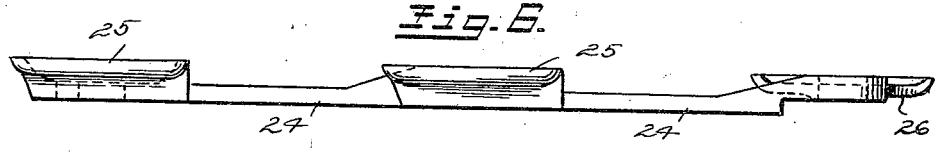
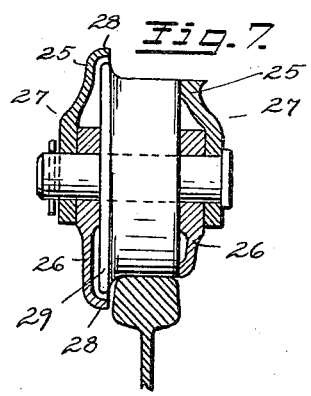
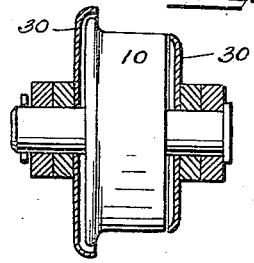
Inventor
Glenn E. Edmunds
By W. D. McDowell.
Attorney Patented May 1, 1928.

1,667,844

UNITED STATES PATENT OFFICE.

GLENN E. EDMUNDS, OF COLUMBUS, OHIO, ASSIGNOR TO THE BONNEY-FLOYD COMPANY, OF COLUMBUS, OHIO, A CORPORATION OF OHIO.

CONVEYER CHAIN.

Application filed April 5, 1926. Serial No. 99,761.

This invention relates to improvements in conveyer chains, and is especially directed to the provision of an improved chain adapted for use in the supporting of the molds or buckets of pig casting machines. In such machines, the molds or buckets are connected at their end portions to wheeled conveyer chains which operate over suitable tracks or guides and permit of the removing of the molds in fixed orbits from metal receiving to metal discharging positions.

Considerable difficulty has been encountered in the operation of machines of this character due to the accumulation of metal within the wheel bearings and link joints of the conveyer chains. This metal upon cooling has a tendency to cause the wheels to stick or adhere to their journaling axles, preventing the free rotation of the wheels and produces a rigid condition wherein excessive friction and wear is present together with the incidental unsatisfactory operation of the conveyer as a whole.

In accordance with the present invention there is provided a novel form of chain for machines of this character wherein the individual links of the chains are constructed to provide enlarged guards, arranged adjacent to the supporting wheels of the chain, and so related to said wheels that the molten metal in splashing over the sides of the buckets or molds will be prevented from coming into contact with the wheel bearings and thus enabling said wheels to operate freely, properly and without undue friction for extended periods.

Another object of the invention resides in constructing the chain with novel supporting members for connecting the molds or buckets with the link sections of the chain, this result being accomplished in a simple and practical manner, without interfering with the movement of the chain around the drive and guide sprockets of the machine.

Figure 1:
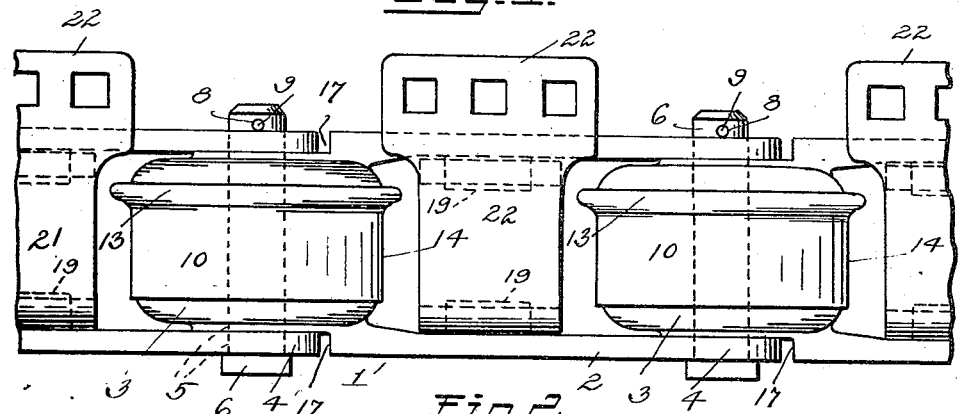
Figure 2:
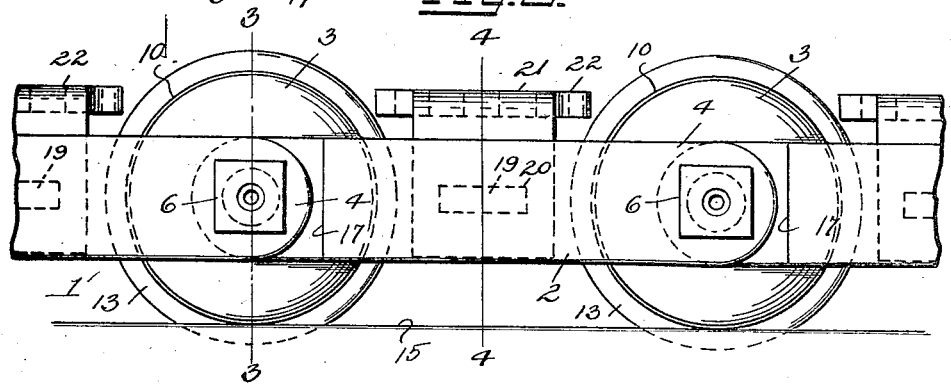
Figure 3:
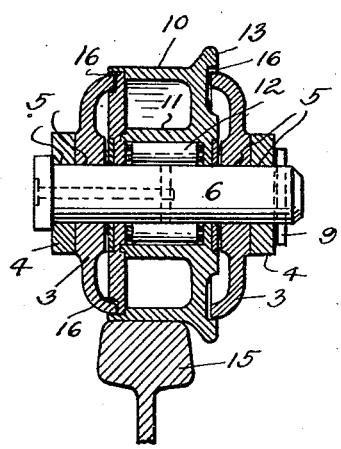
Figure 4:
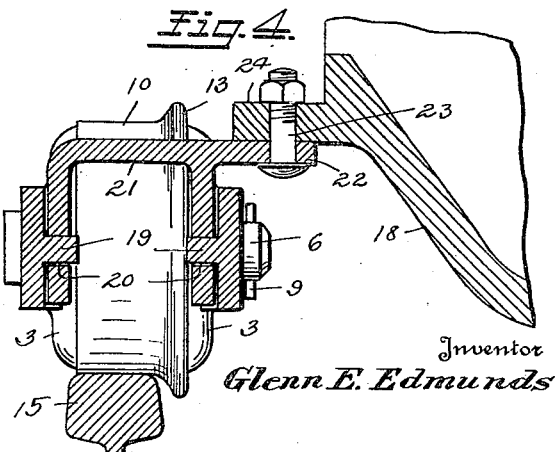

For a further understanding of the invention reference is to be had to the following description and the accompanying drawings, in which:

Figure 1 is a plan view of a conveyer chain constructed in accordance with the present invention, Figure 2 is a side elevation thereof, Figure 3 is a vertical transverse section taken on the line 3—3 of Figure 2, Figure 4 is a similar view on the line 4—4 of Figure 2, Figure 5 is a side elevation of a modified form of the invention, Figure 6 is an edge elevation of the same, Figure 7 is a sectional view taken through the assembly thereof, Figure 8 is a similar view showing another modified form of the invention, Referring more particularly to the drawings the numeral 1 designates the improved conveyer chain comprising the present invention in its entirety. As shown, this chain is composed of a plurality of articulately united links 2, arranged in pairs and provided with overlapping meeting ends 3 and 4. The ends 3 and 4 of adjacent link sections are provided with registering openings 5 for the reception of transversely extending axle pins or bolts 6. These pins or bolts are arranged so that their head ends 7 are arranged on the outside of said links and have their inner or shank ends provided with transversely extending openings 8 for the reception of cotter keys or holding pegs 9.

Between the link sections and rotatably journaled about the axes of the pins 6 are track engaging wheels 10, the latter being formed with internally arranged hubs 11 in which are positioned roller or other anti-friction bearings 12 to facilitate the rotation of the wheels about their journals. The wheels 10 are each formed to include the usual peripheral flange 13 and an annular tread surface 14, the latter being adapted to engage with the usual supporting tracks 15 provided in connection with pig metal casting machines.

An outstanding feature of the present invention resides in providing the link sections of the chain 1 with the enlarged ends 3 of disk formation which are shaped to co-operate with the sides of the wheels 10 to prevent molten metal from entering the supporting bearings of the wheels 10. It will be observed that each link 2 is provided at one end with the enlarged spherical head or guard 3 and, as shown in Figure 3, the cross-sectional formation of each guard 3 is such that its outer peripheral edge will be received within grooves or depressions 16 provided in the sides of the wheels 10. Moreover, the ends 3 of the links are each formed to include offset shouldered portions 17 provided with smooth outer surfaces against which is placed and received the smaller ends 4 of said link sections and by this construction the links are permitted to articulate freely about the connecting bolts 6. Since the peripheral edges of the guards 3 closely engage the sides of the wheels 10 it will be seen that it will be impossible for molten metal, jostled or thrown from the machine, from flowing down the sides of said wheels and finding access to the bearings 12. By this construction I overcome one of the principal faults with machines of this kind now in general use and provide at all times freely turning wheels so as to eliminate friction, dragging and unevenness in the operation of the machine as a whole. It is particularly essential that the wheels should be guarded in this manner especially when roller bearings are employed, although the necessity is vitally present even when plain bearings are being used, and it will be understood that the invention is applicable to wheel bearings of any desired type.

Another feature of the invention resides in the provision of novel supporting means for uniting the ends of the metal receiving buckets or molds 18 with the chain. In the present instance this is accomplished by forming the inner faces of said link sections to include inwardly and laterally projecting integral lugs 19, and during the process of assembling the chain these lugs are positioned within registering slots 20 provided in arched bridge members 21. By the arched formation of the bridge members 21 the latter will be so positioned that their transverse webs will be free from interference with the teeth of drive or guide sprockets (not shown), around which the chain is trained. Each of the bridge members includes an inwardly and laterally projecting lug 22 upon which rests and is secured as at 23 an offset tongue 24 formed with the ends of the molds 18. By this construction it will be observed that the link sections of the chain are duplicates and can be cast from a single pattern. This is a practical feature in design in that it avoids undue multiplicity of different parts and facilitates repairs when the chain is in active operation. It will be seen that by the construction of the chain the wheel bearings are effectively carried and their clogging with molten metal is prevented. The cross-sectional form of the guards 3 is such that molten metal contacting with the same is readily shed by the curvature of the walls of said guards and is forced away from the wheel bearings. Moreover, the construction of the bridge member is such as to avoid sliding the chain links as is the present custom, and a much stronger construction is produced. While the invention has been particularly described as being adapted for use in connection with pig casting machines, it will be appreciated that it is not limited to this peculiar field of activities, but may find service in any capacity where it is necessary in a conveyer chain to protect associated wheel bearings.

In the modified form of the invention disclosed in Figures 5 to 7 inclusive, the link sections 24 of the chain 1 have their ends provided with upper and lower segmental head portions 25 and 26. These head portions are so arranged that when assembled they form a substantially circular guard 27. It will be noted that the upper head portion 25 overlies the sections 26 in such manner as to prevent the molten metal from coming between the links 24 at the wheel bearings. Moreover the inner guards of the links nearest the buckets have their periphery formed with overlapping edges 28. These edges overhang the flange 29 of the wheels 10 as an additional protection against the molten metal.

In Figure 8 of the drawing the guards 30 are formed separate from the links and may be of sheet metal construction.

What is claimed is:

1. A conveyer chain consisting of a plurality of link sections provided with overlapping ends, a bolt connecting the ends of said link sections articulately, a wheel journaled for rotation between said link sections about the axes of said bolt, and guard means formed with said link sections and arranged to cover the sides of said wheels.

2. A conveyer chain comprising a pair of longitudinally extending transversely spaced link sections, a transverse member articulately uniting the ends of said link sections, a wheel journaled for rotation about the axis of said member and disposed between said link sections, and guards carried by said link sections and arranged to surround the bearing hub of said wheel.

3. As a new article of manufacture, a link for conveyer chains comprising a longitudinally extending body having an offset circular enlargement provided upon at least one end of said link section and possessing a diameter materially greater than the body portion of said section.

4. As a new article of manufacture, a link section for conveyer chains comprising a longitudinally extending body portion having at one end thereof an enlarged circular head, said head lying in a plane offset with respect to the body portion of said link.

5. As a new article of manufacture, a link for conveyer chains comprising a longitudinally extending body portion, and an enlarged head provided upon at least one end of said link and arranged in a plane offset with respect to the body portion of said link.

6. A conveyer chain comprising a plurality of longitudinally extending transversely spaced link sections, said link sections being provided with registering overlapping end portions, means for pivotally uniting the overlapping end portions of said link sections, a wheel journaled for rotation between the overlapping ends of said link sections, and guard devices carried by said link sections and cooperating with the sides of said wheel to surround the axial bearing thereof.

7. In a pig casting machine, a mold supporting chain comprising a plurality of pivotally connected link sections, bolts pivotally uniting the adjoining end portions of links, supporting wheels positioned between said links and journaled for rotation about the axes of said bolts, the sides of said wheels being provided with annular grooves, and enlarged guards integrally formed upon the ends of said links and having the peripheral portions thereof positioned within said grooves.

8. A conveyer chain comprising a plurality of longitudinally extending transversely spaced link sections, said link sections being provided with registering overlapping end portions, means for pivotally uniting the overlapping end portions of said link sections, a wheel journaled for rotation between the overlapping ends of said link sections, and guard devices carried in connection with said link sections.

In testimony whereof I affix my signature.
GLENN E. EDMUNDS.